INVENTOR.
BERNELL D. ABEL

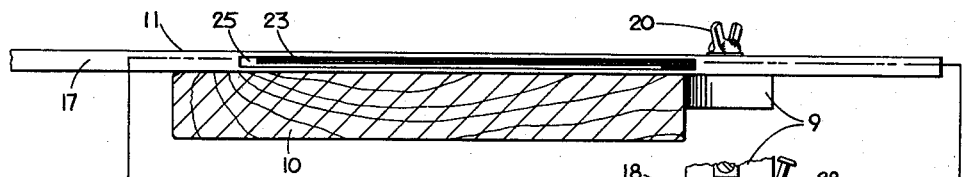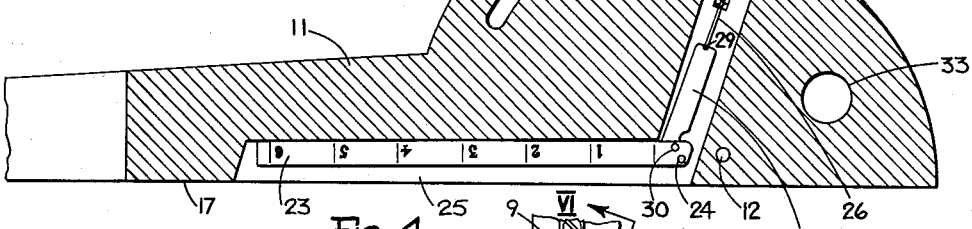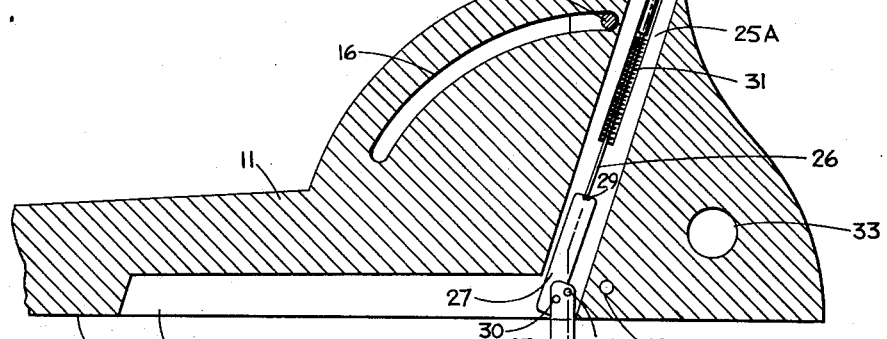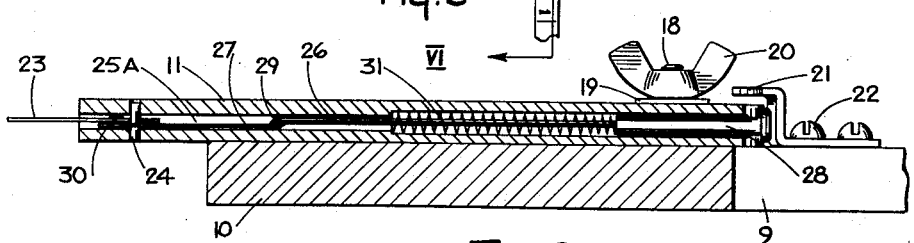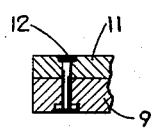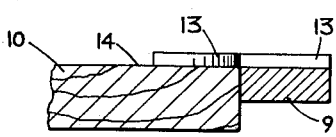

United States Patent Office 2,906,303
Patented Sept. 29, 1959

2,906,303
ONE-HAND-OPERABLE OFFSET MEASURING GAGE AND PORTABLE HAND SAW GUIDE

Bernell D. Abel, Ventura, Calif.

Application May 12, 1958, Serial No. 734,535

4 Claims. (Cl. 143—6)

Generally speaking, the present invention relates to the woodworking tool art and, more particularly, relates to a portable hand saw guide having a quickly operable offset measuring gage for setting a guide line for a power saw.

The principal object of the present invention is to provide a portable hand saw guide having a finger operable measuring gage for determining the amount of space necessary to compensate for the offset area of a portable power saw.

Another object of the present invention is to provide a portable hand saw guide having protractor markings thereon and including a spring biased, automatically retractable offset measuring gage.

With the above points in mind, it is a further object of the present invention to provide a portable hand saw guide having a finger operable offset measuring gage whereby it is possible to actuate the offset measuring gage with one finger of the hand that is steadying the portable hand saw guide in order that the other hand may be entirely free to operate the power hand saw.

It is a still further object of the present invention to provide a device of the character set forth in the preceding objects, which is inexpensive to manufacture, simple, easy to operate, and of virtually foolproof construction.

Other and allied objects will be apparent to those skilled in the art after a careful perusal, examination, and study of the accompanying illustrations, the present specification, and the appended claims.

To facilitate understanding, reference will be made to the hereinbelow described figures, in which:

Fig. 3 is a front elevational view taken along the line III—III in Fig. 1;

Fig. 4 is a cross-sectional view taken along the lines IV—IV in Fig. 3 and with the offset measuring gage in the non-extended position;

Fig. 5 is a cross-sectional view similar to the view shown in Fig. 4, but with the offset measuring gage in the extended position and shown partly broken away for reasons of drawing space conservation;

Fig. 6 is a cross-sectional view of the offset measuring gage taken along the lines VI—VI in Fig. 5;

Fig. 7 is a fragmentary cross-sectional view taken along the line VII—VII in Fig. 1; and Fig. 8 is a fragmentary view taken along the lines VIII—VIII in Fig. 1 and showing the guide lip member.

Figure 1:
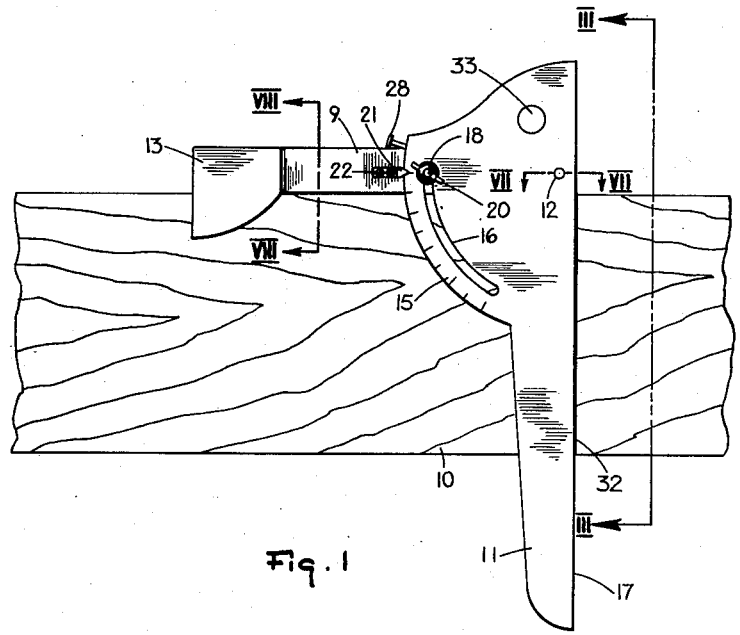
Fig. 1 is a top plan view of the present invention positioned with respect to a piece of work and with the offset measuring gage in the non-extended position.
Figure 2:
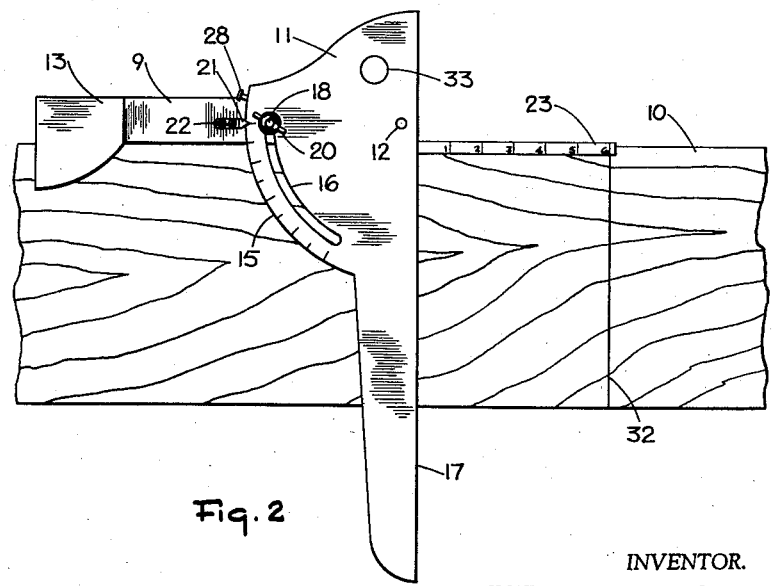
Fig. 2 is a top plan view of the portable hand saw guide mounted on a workpiece and with the offset measuring gage in the extended position.

Generally speaking, the present invention consists of a squaring arm member 9 which is adapted to engage an edge of a work piece 10, as shown in Figs. 1–3, and a saw guide member 11 which is pivotally mounted to the squaring arm member 9 by means of the pivot pin 12, as best illustrated in Fig. 7.

The squaring arm member 9 includes a guide lip member 13 at an end thereof, as shown in Figs. 1, 2, and 8. Said guide lip member 13 helps to steady the entire device and rides upon the upper surface 14 of the work piece 10, as best illustrated in Fig. 8. A hole 33 in the saw guide member 11 permits the entire device to be conveniently hung when not in use.

The saw guide member 11 is provided with protractor markings 15 thereon, adjacent the arcuate slot 16, and a straight lead edge 17, as best shown in Figs. 1 and 2. The movable arm 11 is adjustable to any desired angle and includes locking means which, in the particular example illustrated in Figs. 1–6, takes the form of an exteriorly threaded screw 18 which is fixedly mounted to the arm member 9, as shown in Figs. 4 and 5, and a washer 19 and wing nut 20. A protractor indicator 21 is mounted to the arm member 9 by means of the fasteners 22.

An offset measuring gage 23 is pivotally mounted at 24 and has an extended position, as shown in Figs. 2, 5, and 6, and a non-extended position, as shown in Figs. 1, 3, and 4. The offset measuring gage 23 is positioned within the open slot 25 when in said non-extended position.

A finger actuator 26 is mechanically coupled with respect to the offset measuring gage 23 by means of the link 27, as best illustrated in Figs. 4–6. The finger operable actuator 26 and link 27 are positioned within the slot portion 25A of the arm member 11. The finger actuator 26 includes a headed portion 28 and is affixed to the link 27 at 29.

The link 27 is fastened to the gage 23 by the rivet 30 at a position offset from the pivot pin 24. Spring means 31 encircles the finger actuator 26 and normally biases the offset measuring gage 23 into the non-extended position. Upon release of the headed rod 28 the spring means 31 automatically retract the measuring gage 23 into its non-extended position.

In operation, a desired cut is marked at the line 32, as shown in Figs. 1, and the headed portion 28 of the finger actuator 26 is actuated inwardly thereby causing the offset measuring gage 23 to extend into its extended position and the whole device is then shifted backward into the position shown in Fig. 2 in order to compensate for the offset portion of the power saw. It is sometimes desirable to cut off the gage 23 to a certain predetermined length corresponding to a predetermined power saw offset in order to hasten this process. The whole operation can be accomplished with one hand on the portable hand saw guide and with only one finger required to actuate the gage 23 into its offset measuring or extended position. Thus, the other hand is free to handle the power saw.

Numerous modifications and variations of the present invention will occur to those skilled in the art after a careful study hereof. All such properly within the basic spirit, scope and/or teachings of the present invention are intended to be included and comprehended herein as fully as if specifically described, illustrated, and claimed.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:
1. A one-hand-operable offset measuring gage and portable hand saw guide, comprising: a longitudinal squaring arm member cooperable for engaging an edge of the work; a saw guide member, pivotally mounted with respect to said squaring arm member, provided with protractor markings and a lead edge; an automatically retractable offset measuring gage pivotally mounted within said saw guide member, adjacent said lead edge, said offset measuring gage having a non-extended position, within said saw guide member, and an extended position at right angles to said saw guide member, said offset measuring gage including finger operable actuator means coupled with respect thereto and which is cooperable for extending said offset measuring gage into said extended position; said finger operable actuator means provided with a headed rod coupled to link means; spring means biasing said offset measuring gage into said non-extended position.

2. A one-hand-operable offset measuring gage and portable hand saw guide, comprising: a longitudinal squaring arm member cooperable for engaging an edge of the work; a saw guide member, pivotally mounted with respect to said squaring arm member, provided with protractor markings and a lead edge; an automatically retractable offset measuring gage pivotally mounted within said saw guide member, adjacent said lead edge, said offset measuring gage having a non-extended position, within said saw guide member, and an extended position at right angles to saw guide member; locking means cooperable for selectively securing said saw guide means at any desired angle; said offset measuring gage including finger operable actuator means, mounted within said saw guide member, coupled with respect thereto and which is cooperable for extending said offset measuring gage into said extended position; said finger operable actuator means including a headed rod coupled with respect to link means in driving engagement with said offset measuring gage; spring means biasing said offset measuring gage into said non-extended position; slot means in said saw guide member wherein said offset measuring gage and said finger operable actuator means are mounted.

3. A one-hand-operable offset measuring gage and portable hand saw guide, comprising: a longitudinal squaring arm member cooperable for engaging an edge of the work; a guide lip member on said squaring arm member; a saw guide member, pivotally mounted with respect to said squaring arm member, provided with protractor markings and a lead edge; a spring biased, automatically retractable offset measuring gage pivotally mounted within said saw guide member, adjacent said lead edge, said offset measuring gage having a non-extended position, within said saw guide member, and an extended position at right angles to said saw guide member; locking means cooperable for selectively securing said saw guide means at any desired angle; said offset measuring gage including finger operable actuator means, mounted within said saw guide member, coupled with respect thereto and which is cooperable for extending said offset measuring gage into said extended position; said finger operable actuator means including a headed rod coupled with respect to link means in driving engagement with said offset measuring gage; said link means having one end fixedly attached to said headed rod and a second end which is fixedly attached to said offset measuring gauge; spring means biasing said offset measuring gage into said non-extended position; slot means in said saw guide member wherein said offset measuring gage and said finger operable actuator means are mounted.

4. A one-hand-operable offset measuring gage and portable hand saw guide, comprising: a longitudinal squaring arm member cooperable for engaging an edge of the work; a guide lip member on the upper surface of said squaring arm member; a saw guide member, pivotally mounted with respect to said squaring arm member, provided with protractor markings and a lead edge; a spring biased, automatically retractable offset measuring gage pivotally mounted within said saw guide member, adjacent said lead edge, said offset measuring gage having a non-extended position, within said saw guide member, and an extended position at right angles to said saw giude member; locking means cooperable for selectively securing said saw guide means at any desired angle; protractor indicator means on said squaring arm member; said offset measuring gage including finger operable actuator means, mounted within said saw guide member, coupled with respect thereto and which is cooperable for extending said offset measuring gage into said extended position; said finger operable actuator means including a headed rod coupled with respect to link means in driving engagement with said offset measuring gage; said link means having one end fixedly attached to said headed rod and a second end which is fixedly attached to said offset measuring gage; spring means, encircling said headed rod, biasing said offset measuring gage into said non-extended position; slot means in said saw guide member wherein said offset measuring gage and said finger operable actuator means are mounted.

References Cited in the file of this patent
UNITED STATES PATENTS

| 2,773,523 | Hopla | Dec. 11, 1956 |
| 2,822,834 | Hammers | Feb. 11, 1958 |

FOREIGN PATENTS

| 934,789 | Germany | Nov. 3, 1955 |